Oct. 22, 1968     T. KRAUS     3,407,041
METHOD FOR THE QUANTITATIVE DETERMINATION OF
NITROGEN AND OXYGEN IN METAL SAMPLES
Filed Oct. 23, 1964
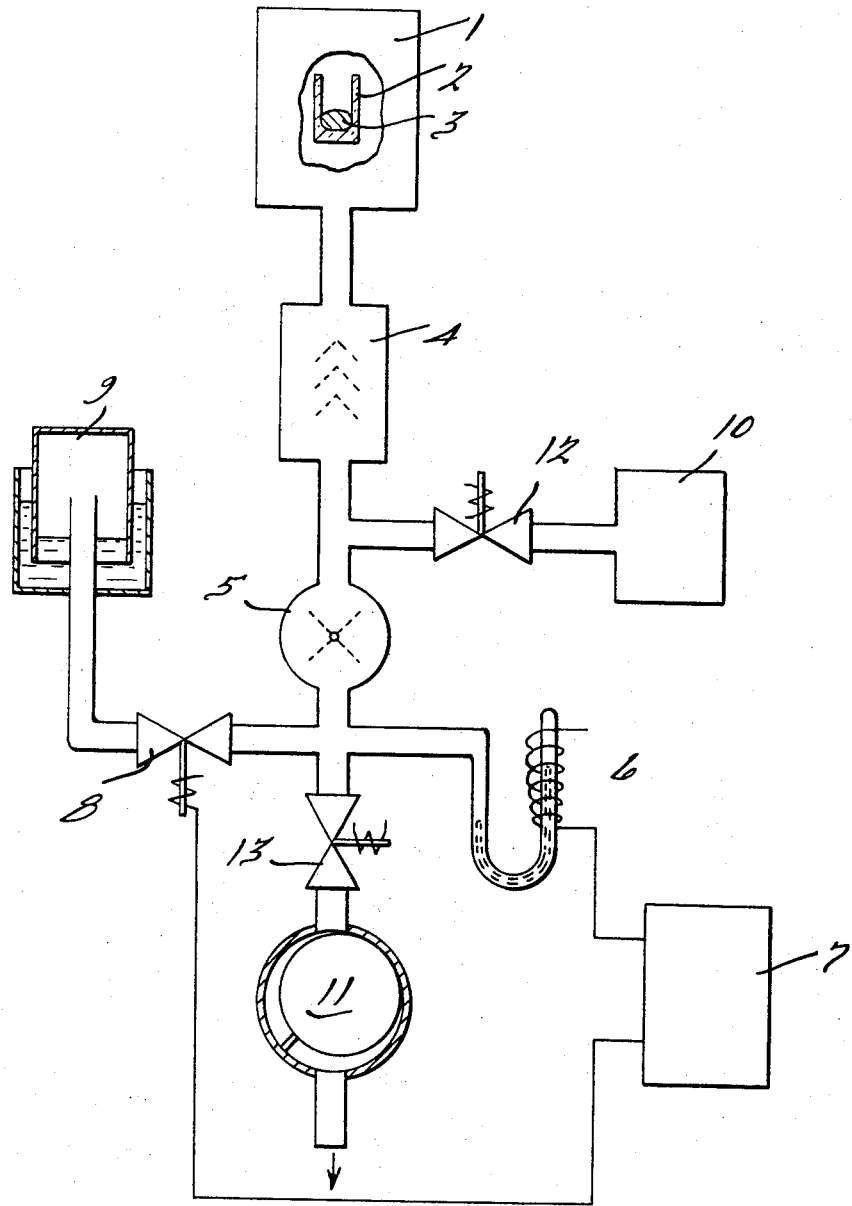
INVENTOR.
Thaddaus Kraus.
BY
ATTORNEY.

United States Patent Office 3,407,041
Patented Oct. 22, 1968

3,407,041
METHOD FOR THE QUANTITATIVE DETERMINATION OF NITROGEN AND OXYGEN IN METAL SAMPLES
Thaddäus Kraus, Vaud, Liechtenstein, assignor, by mesne assignments, to The Bendix Corporation, Detroit, Mich., a corporation of Delaware
Filed Oct. 23, 1964, Ser. No. 406,131
Claims priority, application Switzerland, Nov. 8, 1963, 13,738/63
3 Claims. (Cl. 23—230)

ABSTRACT OF THE DISCLOSURE

A method of quantitatively determining the nitrogen and oxygen content of metal samples by using thermal conductivity of the gases evolved whereby the numerous measurements necessary to properly interpret measured thermal conductivity are no longer necessary. By injecting an amount of hydrogen into the gas sample prior to measurement to achieve a pre-selected gas pressure during the measurement, gas content can be directly computed from a prepared calibration curve. This allows automated computer analysis with reduced storage of calibration curves.

The present invention relates to a method for quantitatively determining nitrogen and oxygen content of metal samples. Normally samples of this kind are melted or heated to a high temperature under vacuum in a carbon or graphite crucible to cause in the samples to be released included gases. These gases are collected and pumped to a gas analyzer in which the quantity of each gaseous component is determined using various physical or chemical methods. Usually the principal gases given off and determined are hydrogen, nitrogen and oxygen. The thermal conductivity of the extracted gas mixture can serve as a measure of the analytical sample size. The analysis of a sample by previous methods is cumbersome because numerous factors must be considered, if the measured value of thermal conductivity is to be correctly interpreted. Thermal conductivity is dependent on the ratio of hydrogen (with a higher thermal conductivity) to that of other gases (with lower thermal conductivities); nitrogen and carbon monoxide have thermal conductivities which are nearly coincident. Thermal conductivity also depends on the physical size of the measuring instrument which is used. For every apparatus a diagram can be determined, in which the pressure in the thermal conductivity cell appears as a parameter in a family of curves, which shows the dependence of the thermal conductivity on pressure in a given sample of $N_2$ and CO ($O_2$ is converted to carbon monoxide upon contact with the graphite crucible when the sample melts). Also for every single thermal conductivity measurement the sampled quantity must be determined numerically by very accurate graphical or mathematical analytical interpretation. It is evident, that a method of this kind not only is very wasteful of time, but inherently has many sources of error and requires trained operating personnel. The old method involves inexact interpolations and does not provide the exactness that is desired. The described difficulties are important, particularly if the known process is to be automated to alleviate the shortage of skilled personnel.

The empirical method for the quantitative determination of nitrogen and oxygen in metal samples, especially by means of automatic gas analyzers, wherein the samples are melted in a carbon crucible under vacuum and the thermal conductivity of the gas mixture formed in the furnace is measured, and from this the combined mass of $N_2$ and CO calculated, is characterized in the present invention by the addition of hydrogen gas to the gas sample before the thermal conductivity is measured. By doing this, the problems previously described are solved in a surprisingly simple way. It is known that a pre-selected isobar on the diagram of quantity versus thermal conductivity can be obtained by the addition of an exact amount of hydrogen. The selection of an isobar eliminates the interpolation step. Based on empirical knowledge, it is recommended that only one suitable isobar, e.g. the 50 torr isobar, be determined with great accuracy and used in all subsequent measurements. Because the time-wasting and tiresome determination of a whole set of curves is eliminated by the calibration of the apparatus, the selected isobar can be determined with greater care and precision. In addition, the automatic setting of one of the selected isobars corresponding to the pressure in the thermal conductivity analyzer can be done very accurately with the aid of automatic pressure and switching gear and without high operating costs. Errors in measurement due to the human element may thereby be completely eliminated.

The use of fully automatic gas analyzers is very desirable in industry; but prior to the present invention it would have been extremely expensive since if complete information was required a computer would have to have been used to store a family of calibration curves and to either determine a very large number of precisely measured calibration curves or perform sufficiently accurate analytical interpolation. With the method of analysis of the present invention, it is sufficient to ascertain one or only a few calibration curves (applicable to certain ranges of measurement) and to store them in a computer without sacrificing accuracy. It should be pointed out, that the determination of a single calibration curve is an especially important advantage. Regular re-calibrations are indispensible and therefore it makes a big difference whether or not a large or small number of calibration curves must be exactly determined.

As an example, an arrangement for using the new technique is schematically shown in the attached drawing.

Referring now to the drawing, numeral 1 designates a vacuum-extraction furnace with a crucible 2, in which the sample 3 is heated. The evolved gases are pumped via pump 4 into a thermal conductivity analyzer 5. Analyzer 5 may be composed of a heating element and a temperature sensor wherein the temperature indicated by the sensor depends on the thermal conductivity of the surrounding gases. Any known analyzer for determining the thermal conductivity of a gas can be considered for use with this invention. The thermal conductivity analyzer 5 is maintained at a preselected pressure at a point between 10 and 100 torr and an induction monometer 6 is responsive to the pressure in analyzer 5 and transmits an electrical impulse to the control panel 7 to control magnetic valve 8 in accordance with a predetermined program to open the valve 8 to connect the line from a hydrogen reservoir 9 to the thermal conductivity analyzer 5. When the preselected and desired pressure in analyzer 5 is reached, the valve 8 closes.

The example includes a carbon monoxide analyzer 10, e.g., an infra-red analyzer, as well as a forepump 11 for evacuating the entire arrangement when valves 12 and 13 are open. The thermal conductivity analyzer can be calibrated to indicate gas weight directly and will thereby give the combined weight of carbon monoxide and nitrogen. After carbon monoxide is determined using the carbon monoxide analyzer, the amount of nitrogen is easily calculated. Oxygen can be determined from the amount of carbon monoxide. Gases other than nitrogen, hydrogen and carbon monoxide are, in practice, negligible, in as much as the determinations are made at sufficiently low pressures and higher degasification temperatures. The reader is referred to "Archiv fur das Eisenhuttenwesen," vol. 33, 527–31 (1962), for more details about gas determinations by thermal conductivity measurements.

I claim:

1. A method of quantitative analysis to determine the nitrogen and oxygen content of metal samples comprising:

the step of heating a metal sample under vacuum in a carbonaceous crucible, to allow occluded oxygen to combine with the carbon of the crucible, the step of conducting the gases evolved from the sample to a gas analyzer chamber, the step of adding hydrogen to the gases in the chamber until a predetermined pressure is obtained, and the step of measuring the thermal conductivity of the gases in said chamber.

2. The method of claim 1 wherein the predetermined pressure is less than 100 torr.

3. A gas analysis system comprising:

a vacuum furnace adapted to receive a sample to be analyzed, a carbonaceous crucible for melting said sample in said furnace, a thermal conductivity gas analyzer directly connected to said furnace, pump means for conveying gases from said furnace to said analyzer, a source of hydrogen, conduit means connecting said source to said analyzer, and means responsive to the pressure in said analyzer for controlling the flow through said conduit means.

References Cited

UNITED STATES PATENTS

| | | | |
|---|---|---|---|
| 2,795,132 | 6/1957 | Boehme et al. | |
| 3,065,060 | 11/1962 | Roehrig et al. | |
| 3,088,809 | 5/1963 | Boatman | 23—254 |
| 3,240,052 | 3/1966 | Reinecke et al. | 73—23.1 |

MORRIS O. WOLK, *Primary Examiner.*

JOSEPH SCOVRONEK, *Examiner.*

R. E. SERWIN, *Assistant Examiner.*